United States Patent
Bainbridge et al.

(10) Patent No.: US 7,429,806 B2
(45) Date of Patent: Sep. 30, 2008

(54) SMART POWER SUPPLY

(75) Inventors: Gregg M. Bainbridge, Rochester, NY (US); George E. Baker, Rochester, NY (US); Franciscus Gerardus Joahannes Claassen, Oploo (NL); Michael Horrocks, Fairport, NY (US); Larry Schuster, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 159 days.

(21) Appl. No.: 11/263,154

(22) Filed: Oct. 31, 2005

(65) Prior Publication Data

US 2007/0096562 A1    May 3, 2007

(51) Int. Cl.
*H02J 1/10* (2006.01)

(52) U.S. Cl. .......................................... 307/52

(58) Field of Classification Search .................... 307/52
See application file for complete search history.

(56) References Cited

U.S. PATENT DOCUMENTS

| 5,297,015 A * | 3/1994 | Miyazaki et al. ............. 363/146 |
| 6,930,893 B2 * | 8/2005 | Vinciarelli .................... 363/17 |
| 2006/0183510 A1 * | 8/2006 | Menas et al. ................. 455/574 |

* cited by examiner

*Primary Examiner*—Robert L. Deberadinis
(74) *Attorney, Agent, or Firm*—Fay Sharpe LLP

(57) ABSTRACT

A power supply includes an input component that receives power from a source and an automatic load sense (ALS) component associated with the power supply that monitors and regulates at least two or more of current and power output from the power supply. An output component that provides power from the ALS component to one or more variable load components.

17 Claims, 5 Drawing Sheets

SMART POWER SUPPLY

BACKGROUND

The following relates to providing load flexibility to a power supply device. It finds particular application with monitoring current and/or power consumption and regulating output of a power supply device.

Power supplies provide power to various electronic components employed in various machines, control processes, etc. Increased and unique power demands may require the development of a revised power supply. In one example, power supplies utilize several different voltages to power various components associated with a personal computer (PC). The power supply can provide each of these voltages, in varying amounts of power depending on the model, directly from its circuitry.

The amount of load required by a particular power supply is often specified as its maximum load. These maximum current requirements can be listed as part of the power supply's output specifications. The amount of load required can vary considerably between different form factors, between manufacturers and between specific designs from the same manufacturer.

In general, when a power supply's output is discussed, a particular number of watts are specified. An output rating refers to the nominal, total maximum output power of all the voltages that the power supply provides. With relation to DC electricity, the computation of power is determined by multiplying its current in Amps, and its voltage in Volts. Typically, however, power supplies produce several different voltages rendering such a basic computation insufficient.

Output specifications for a power supply, generally include all the different voltages that the power supply provides, and the amount of current it can supply for each. This is sometimes called the power distribution for the supply. Each voltage produced by a power supply can be employed for a different purpose, which is why individual current ratings should be checked for each voltage, and not just use the total wattage of the supply. The goal behind analyzing the power supply's output rating and power distribution is to match it to the needs of your system to ensure it will provide the power needed. The key problem is to determine exactly how much power a given system uses.

For instance, with regard to peripheral components, the current (or power) rating of a device such as a hard disk, refers to the manufacturer's claim of how much the device uses during normal, continuous operation. The actual peak draw of the device is at its maximum, however, at startup—not while it is running. The +12 voltage provided by the power supply is used primarily to drive disk drive motors. Because of their design, these motors can take up to double their steady-state current when they are spinning up from rest. For example, if three or four hard disks are employed in a system and all of them start up at the same time, this can be a tremendous demand on your power supply's ability to provide +12V power.

At any given point in time, each voltage line may have dynamic power requirements. Conventionally, in order to accommodate such fluid power requirements, a power supply would have to be designed to accommodate power that far exceeded normal usage levels. Such increased and unique power demands can cause frequent power supply redesigns resulting in excess development and implementation costs as well as delayed implementation schedules. Such power demands are difficult to predict in the near term. Thus, systems and methods are needed to flexibly determine and provide appropriate current and power required by particular components within a system.

BRIEF DESCRIPTION

In one aspect, a power supply includes an input component that receives power from a source and an automatic load sense (ALS) component associated with the power supply that monitors and regulates two or more of current and power output from the power supply. An output component that provides power from the ALS component to two or more variable load components.

In another aspect, a method to regulate the output of a power supply is employed that includes measuring the current on two or more voltage line outputs from the power supply and comparing the current measured from each voltage line to a predetermined reference value. The power is to be distributed based upon demand but will not allow an individual output or the entire power supply rating to be exceeded.

In yet another aspect, a system includes an electronic load that controls at least one variable load component associated with the system. A power supply is operatively coupled to the electronic load that provides power to the at least one variable load component. An automatic load sense (ALS) component monitors two or more of the current and the power provided on at least one voltage line by the power supply. A regulation component compares at least one of power and current to a predetermined threshold and powers down at least one voltage line if at least one of power and current exceed a predetermined threshold.

DETAILED DESCRIPTION

Figure 1:
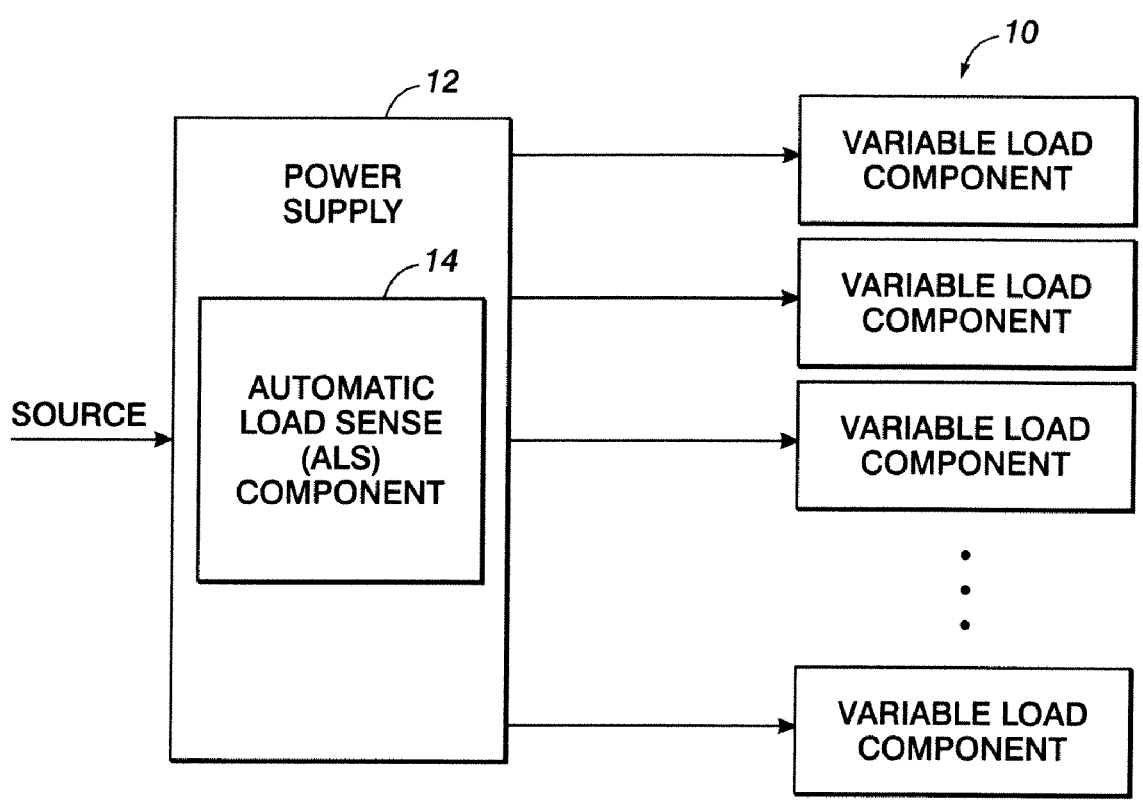
FIG. 1 illustrates a power supply that utilizes an automatic load sensing component with one or more variable load components.

With reference to FIG. 1, a system is illustrated that provides power to one or more variable load components (VLC) 10 from a source via a power supply 12. The two or more variable load components will be referred to as reference numeral 10. The power supply 12 includes an automatic load sense (ALS) component 14 which monitors the power output from the power supply 12 to prevent overloading.

The power supply 12 can be employed to convert power received from the source into two or more desired voltage levels. In one example, the power supply is a switching power supply wherein an internal circuit switches the load current on and off in order to stabilize the output voltage. The power supply 12 can be employed to convert alternating current to direct current, direct current to alternating current, to convert voltage and/or current levels or to convert the frequency of power received.

One or more sources can be received by the power supply 12. Such sources can include substantially any type of signal with one or more current and voltage levels and frequencies associated therewith. In addition, the source signal can be transmitted via direct current or alternating current. The current drawn by the power supply 12 can be determined by the loading associated with the power supply 12. In one example, the source is 115 VAC with a frequency of 60 Hz. In another example, the source is 220 VAC with a frequency of 50 Hz.

The power supply 12 can be constructed utilizing substantially any form factor and employed in substantially any environment via one or more electrical connections. In one example, the power supply is one of an ATX/NLX, SFX or WTX form factor. Each form factor can provide particular voltage outputs to be utilized by the VLC 10 connected thereto. In one approach, the power supply 12 provides a 3.3 VDC, 5.5 VDC and a 12.1 VDC signal to peripherals associated with a PC.

The VLC 10 can be operatively coupled to the power supply 12 utilizing one or more power transmission connections and can be substantially any device that draws current from a power source. The VLC 10 is a plurality of components related to the input, output and/or control of a particular system wherein each of VLC 10 has particular power, voltage and current requirements for proper operation. In another example, the power supply 12 is employed with a mother board in a personal computer. In this manner, the power supply can provide power while the associated component provides desired control functionality. In one example, the motherboard is operatively coupled to a floppy drive, a hard disk drive and a CD/ROM drive wherein each of the drives has a particular power requirement.

The ALS component 14 is operatively coupled to each of the connections to the two or more VLC 10 in order to determine the amount of power utilized by each variable load component 10. In one approach, the power supply provides three disparate voltage levels, 3.3V, 5.1V and 12.1V wherein several components utilize each voltage level. In one approach the 3.3V line draws 35 A, the 5.1V line draws 35 A and the 12.1V line draws 15 A, for a total power requirement of 475 watts. In another approach, the 3.3V line draws 10 A, the 5.1V line draws 5 A and the 12.1V line draws 35 A, for a total power requirement of 482 watts.

In either of the foregoing examples, a power supply capable of 500 W could adequately provide power to the system via the three voltage output lines. However, if all three voltage lines had a maximum current draw (e.g., 35 A per line), the power required would be 717 watts, thereby exceeding the rating of the 500 W power supply. The power supply 12 employs the ALS component 14 to prohibit such excessive power draw from occurring.

The ALS component 14 can be substantially any device that can store and execute a series of commands and provide some level of control to one or more external devices based at least in part upon the commands executed. In one example, the ALS portion is a microprocessor that stores an executable program. The program can be stored in a memory (not shown) such as RAM, ROM, flash ROM, EEPROM, etc. The program can be executed based on an event, periodically or one time. The ALS component 14 can be employed to disable one or more voltage lines based upon the occurrence of one or more predetermined events. In one example, a predetermined event is when a particular current level is exceeded. In another example, an event occurs when a total power level is exceeded.

The ALS component 14 can monitor the current draw on each of voltage lines of the power supply 12 on a periodic basis. If the current level any one or more of the lines is exceeded, power to these lines can be discontinued or limited. Additionally, the total power delivered by the power supply 12 can be regulated such that a predetermined level is not exceeded. Such power regulation provides additional benefit in that the power supply 12 can be designed to provide a generally lower power output than conventional designs.

In one example, utilizing the ALS component 14, a 500 W power supply can provide power to voltage lines that may, under conventional designs, draw in excess of 700 watts. Such an approach is possible because the ALS component 14 can discontinue power provided to one or more voltage lines in order to prevent current draw that exceeds the rating of the power supply 12. In one approach, power to the voltage lines is discontinued in a sequential manner (e.g., highest to lowest voltage, etc.) to reduce power output as quickly as possible. In this manner, deleterious effects associated with excessive current draw can be mitigated.

The ALS component 14 provides several benefits over conventional power supply configurations which are typically designed for one particular load. Utilizing the ALS component 14 with power supply designs allows a single development/qualification/implementation thereby conserving resources. In addition, only a single configuration is needed to provide support to existing power supplies in the field. By utilizing the ALS component 14, the power supply 12 can be employed to provide power to substantially any load and thus, can replace existing power supplies employed in the field. In addition, future loads (e.g., PC peripheral components, motherboards, drives, etc.) can be accommodated by the power supply 12. Also, due to the flexibility of output of the power supply 12, obsolescence issues will be mitigated. Component size and cost will be decreased since conventional oversized power supply designs will not be employed. Instead, overloading protection is provided via the ALS component 14 which affords intelligent control of the power supply 12 outputs.

Once power is discontinued, notification of such a condition can be transmitted to one or more external components. A visual and/or audio notification can be given. In addition, substantially any media such as email, paging, fax, telephonic transmission, etc. can be transmitted to one or more recipients. In response to such notification, the recipient can reset the power supply to return power to the VLC 10.

Figure 2:
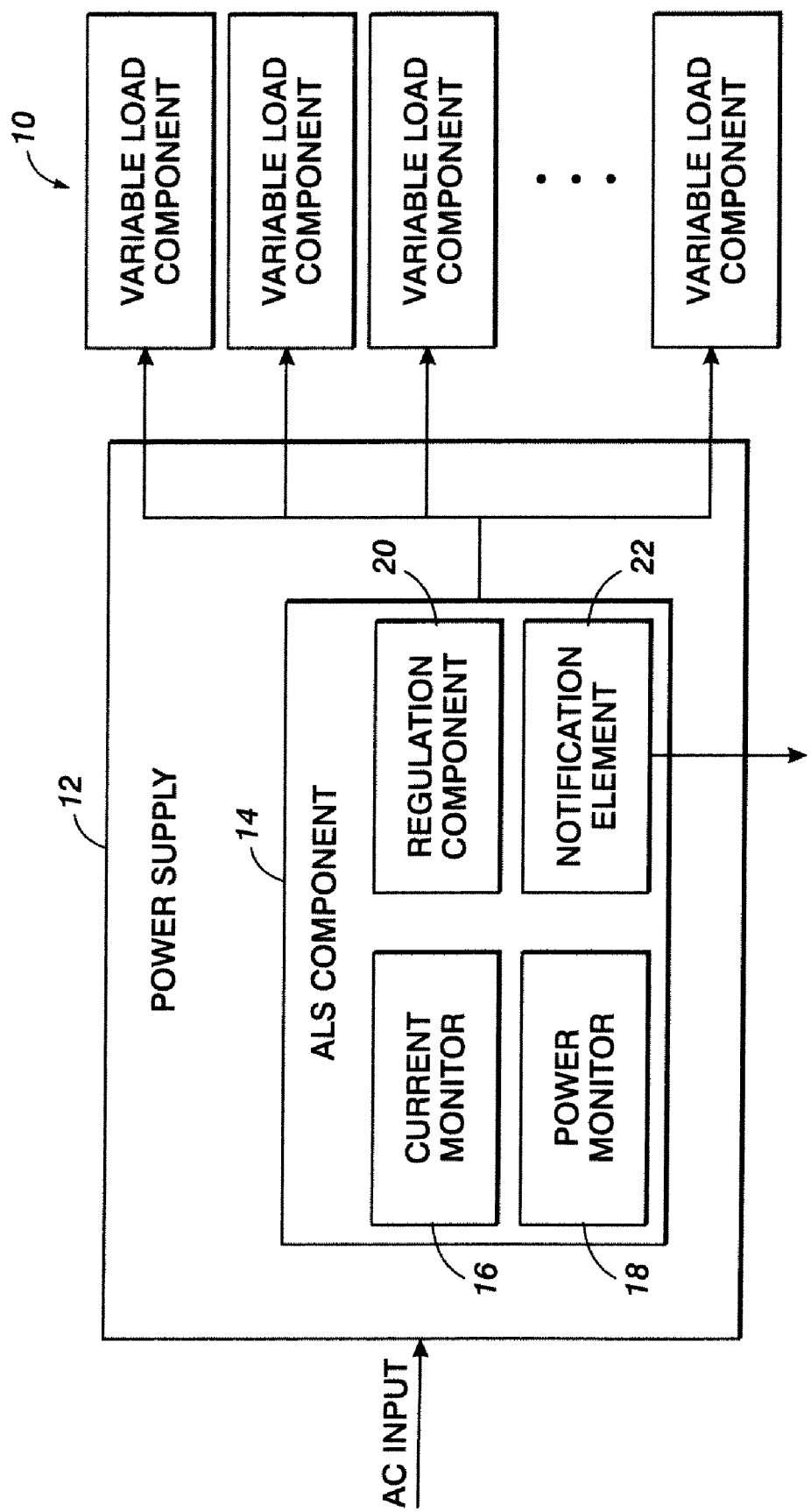
FIG. 2 illustrates the system of FIG. 1 in which the sub-components of the ALS component are shown.

FIG. 2 illustrates the VLC 10 and the power supply 12 including the ALS component 14. The ALS component 14 includes a current monitor 16, a power monitor 18, a regulation component 20 and a notification element 22. The ALS component 14 can utilize the foregoing components in order to monitor the current and power draw on the power supply 12 and to provide a notification to one or more recipients when necessary. In addition, the ALS component 14 can determine which, if any, of the output lines need to be idle in order to continue to provide power to the remaining VLCs 10. Alternatively, the ALS component 14 can power down the entire power supply 12 in order to prevent damage associated with overloading.

The current monitor 16 can determine the amount of current drawn from the power supply 12. Such current draw can be monitored on each of the voltage lines and/or the total amount of current drawn from the power supply. Two or more monitoring components can be physically incorporated into each of the voltage output lines of the power supply 12. In one approach, current monitor 16 can be an ammeter placed in series with each of the voltage output lines. A summation component (not shown) can receive the current reading from each voltage line ammeter and output a total current draw from all of the voltage lines at any given point in time.

The power monitor 18 can determine the amount of power drawn from the power supply 12 at any given point in time. In one approach, the total power draw can be calculated by multiplying the current times the voltage level on each line that delivers power to one or more components. In another example, one or more disparate formulae can be employed to determine the power output of the power supply 12.

The regulation component 20 can be coupled to at least one of the current monitor 16 and the power monitor 18. The regulation component 20 can be programmed to contain one or more predetermined thresholds associated with at least one of the load current monitor 16 and the power monitor 18. Such predetermined thresholds can be related to one or more rating levels associated with the power supply 12. The regulation component 20 controls the amount of current and/or power output by the power supply 12 to stay below the one or more predetermined thresholds. In this manner, overloading of the power supply 12 caused by excess power and/or current levels can be prevented.

The regulation component 20 can employ various machine learning techniques, algorithms, approaches, etc. to facilitate determining appropriate thresholds for line current, line power and/or the order in which output line shutdowns occur. For example, the regulation component 20 can employ a machine learning algorithm that can reason about or infer from the historical activity, past power usage, amount of loading of the power supply, etc. Various classification (explicitly and/or implicitly trained classifiers) schemes and/or systems (e.g., support vector machines, neural networks, expert systems, Bayesian belief networks, fuzzy logic, data fusion engines . . . ) are employed by the regulation component 20. Such classification can employ a probabilistic and/or statistical-based analysis (e.g., factoring into the analysis utilities and costs) to automatically make decisions. One example of a suitable classifier is a support vector machine (SVM). Other directed and/or undirected model classification approaches include, naive Bayes, Bayesian networks, decision trees, neural networks, fuzzy logic models, and probabilistic classification models providing different pattern of independence, for example. Classification as used herein also is inclusive of statistical regression that is utilized to develop models of priority.

One or more actions can be initiated based at least in part upon the power and/or current levels regulated by the regulation component 20. For example, a signal can be transmitted to the notification element 22 for further processing. In another example, one or more voltage output lines can be turned off. In yet another example, the entire power supply 12 can be powered down. In this manner, output of the power supply 12 can be regulated to prevent usage above one or more predetermined levels.

The notification element 22 can provide a message to one or more recipients to indicate that a particular condition exists relative to the power supply 12. The notification element 22 can be coupled to the load current monitor 16, the power monitor 18, and/or the regulation component 20. Notification can be provided to indicate any number of conditions and/or events have occurred. In one example, various colored lamps are illuminated (e.g., green, yellow, red, etc.) to indicate that a predetermined level is approaching and/or has been reached. In addition or alternatively, one or more media can be employed to transmit and/or display information related to power supply 12 conditions.

Figure 3:
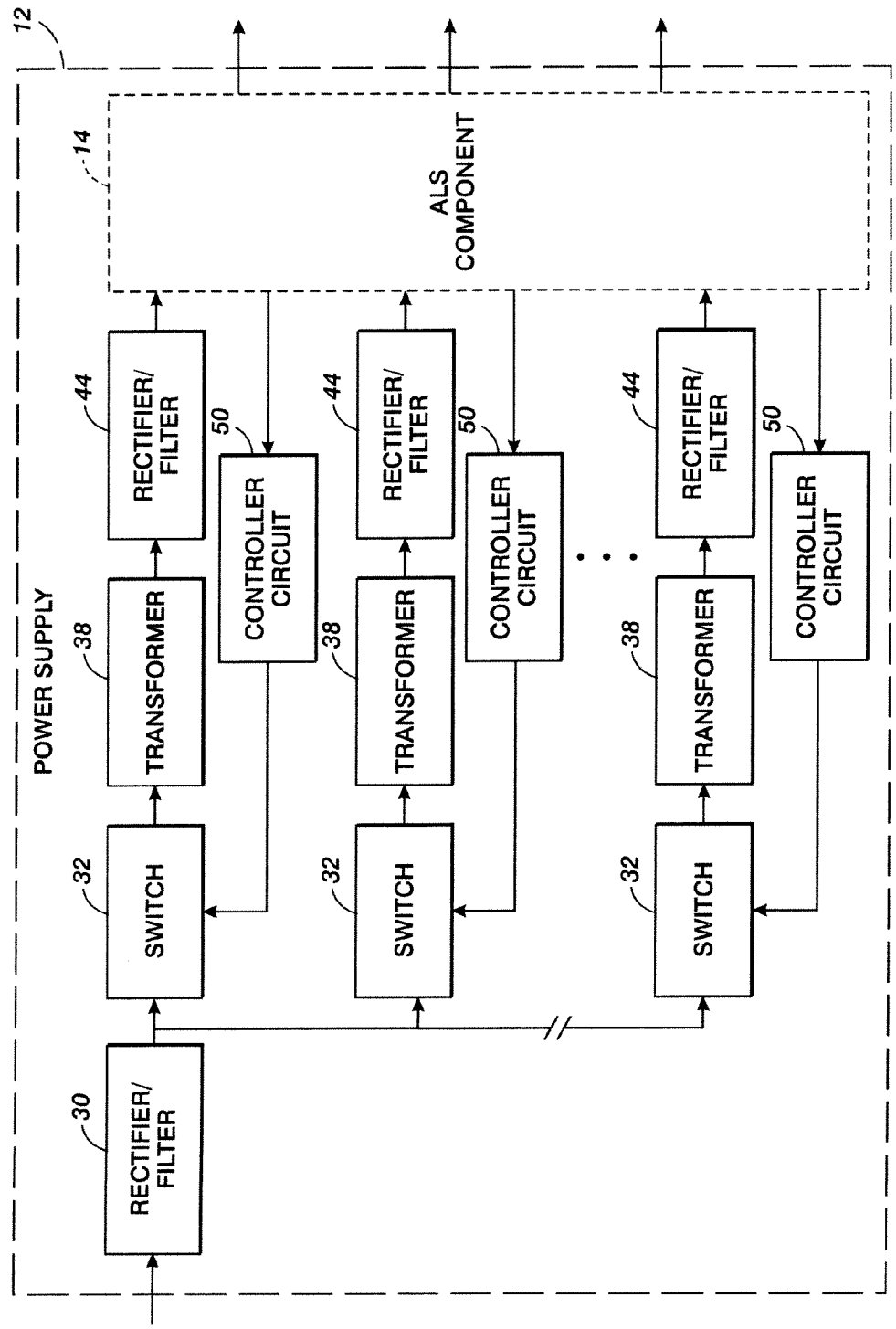
FIG. 3 illustrates a plurality of arms of a power supply each connected to a particular load component.

FIG. 3 shows the power supply 12 which provides a plurality of voltage outputs to one or more components (not shown). It is to be appreciated that although three outputs are shown, up to N voltage outputs can be provided from the power supply 12 where N is an integer greater than or equal to one. A rectifier/filter 30 receives power from an external source and transmits this power to switches 32, 34 and 36. The switches 32, 34 and. 36 in turn transmit their respective signals to transformers 38, 40 and 42. Rectifier/filters 44, 46, and 48 provide rectified DC power to the ALS component 14 for further processing. Power is output to one or more external components (not shown) via the ALS component 14.

In one example, the power supply 12 receives an AC input wherein the rectifier 30 converts this input to a direct current (DC) signal. The rectifier can produce an unregulated DC voltage which is then smoothed by a filter element, such as a capacitor, for example. The current drawn from the input by the rectifier 30 can occur in short pulses around the AC voltage peaks. These pulses have significant high frequency energy which can reduce the power factor associated with the AC input. It is to be appreciated that rectification of the signal is not required if the power supply receives a DC input.

In another example, utilizing an input range switch (not shown), the rectifier 30 can be configured to operate as a voltage doubler when operating on a low voltage (e.g., 120 VAC, etc.) range and as a straight rectifier when operating on a high voltage (e.g., 240 VAC, etc.) range. If an input range switch is not utilized, then a full-wave rectifier is can be employed and an inverter stage (e.g., switches 32, 34 and 36) can be employed to accept a wide range of DC voltages produced by the rectifier 30. If the power supply 12 is associated with higher power levels, some form of automatic range switching can be employed.

The switches 32, 34 and 36 convert the DC signal, whether directly from the input or from the rectifier stage described above, to AC by switching it on and off ("chopping") at a frequency of tens or hundreds of kilohertz (kHz). In one example, the frequency is switched to a frequency greater than 20 kHz to make it inaudible to humans. In one approach, the switching can be done by MOSFET transistors, which have a low on-resistance and a high current-handling capacity. The switches 32, 34 and 36 can be controlled to produce variable "on" time, which feeds the transformers 38, 40 and 42 with the switched energy. By controlling the "on" time of the switch, the output of the transformer can be regulated.

The output of the transformer is rectified and filtered via the rectifier/filters 44, 46 and 48. The noise that is filtered can be comprised of both line ripple and higher frequency switching noise. This switching noise can be generated from the switch noise itself and, to a lesser extent, the reverse recovery from the rectifier/filters 44, 46 and 48.

In one example, the inverted AC can be utilized to drive the primary winding of the high-frequency transformers 38, 40 and 42 to isolate the output from the input. This converts the voltage up or down to a required output level on the secondary winding of the transformers 38, 40 and 42. If a DC output is required, the AC output from the transformer can be rectified and smoothed by a filter consisting of inductors and capacitors.

Non-isolated power supplies can be employed if power isolation is not required, wherein an inductor is employed instead of the transformers 38, 40 and 42. This can include boost converters, buck converters and a buck-boost converter. These belong to the simplest class of single input, single output converters which utilize one inductor and one active switch (e.g., MOSFET, etc.). The buck converter reduces the input voltage, in direct proportion, to the ratio of active switch "on" time to total switching period, called the duty ratio. For example, an ideal buck converter with a 10V input operating at a duty ratio of fifty percent will produce an average output voltage of 5V. A feedback control loop is usually employed to maintain (regulate) the output voltage by varying the duty ratio to compensate for variations in input voltage.

The output voltage of a boost converter is always greater than the input voltage. The buck-boost output voltage is inverted but can be greater than, equal to, or less than the magnitude of its input voltage. It is to be appreciated there are many variations and extensions to this class of converters but these three form the bases of almost all isolated and non-isolated DC to DC converters. By adding a second inductor, alternative converters (e.g., Cuk, SEPIC, etc.) can be implemented by adding additional active switches to provide various bridge converters. In another embodiment, the power supply 12 can employ a capacitor-diode voltage multiplier instead of inductors and/or transformers. Such implementations are typically utilized for generating high voltages at low currents.

The controller circuits 50, 52 and 54 can monitor the output voltage sent to the ALS component 14 and compare it to a reference voltage. Such reference voltage can be set manually or electronically to the desired output. If there is an error in the output voltage (e.g., the voltage level is too high, etc.), the controller circuits 50, 52 and 54 can compensate by adjusting the timing with which the switches 32, 34 and 36 are switched on and off. Thus, the controller circuits can be referred to as switching regulators. Depending on particular design/safety requirements, the controller may or may not contain an isolation mechanism (e.g., opto-couplers, etc.) to isolate it from the DC input. In an alternative embodiment, an open loop regulator can be employed, which does not employ a feedback circuit. Instead, open loop regulators rely on feeding a constant voltage to the input of the transformer or inductor, and assume that the output will be correct.

The ALS component 14 receives power from the rectifier/filters 44, 46 and 48. As noted, each of the rectifier/filters 44, 46 and 48 can provide substantially any voltage level. The ALS component 14 monitors the amount of current required to drive the one or more components connected to the power supply 12. If the ALS component 14 determines that the amount of current and/or power required by one or more external components (not shown) exceeds a predetermined threshold, the ALS component 14 can idle one or more output lines in order to prevent overloading of the power supply 12.

In one embodiment, an algorithm can be employed to limit the total current and/or the total power supplied by the power supply 12. A specific formula can be employed by the algorithm to determine the maximum allowable current that will be provided by each voltage line. For example, three formulas for maximum allowable current, $I_{MAX}$, employed with three voltage lines 3.3V, 5.1V and 12.1V, are listed below:

$$I_{MAX(3.3\ VDC)} = 144 - (1.54 * I_{5.1\ VDC}) - (3.66 * I_{12.1\ VDC}) \quad (1)$$

$$I_{MAX(5.1\ VDC)} = 93 - (0.65 * I_{3.3\ VDC}) - (2.37 * I_{12.1\ VDC}) \quad (2)$$

$$I_{MAX(12.1\ VDC)} = 39.3 - (0.27 * I_{3.3\ VDC}) - (0.42 * I_{5.1\ VDC}) \quad (3)$$

$I_{3.3\ VDC}$ is the average output current for the 3.3V output terminal; $I_{5.1\ VDC}$ is the average output current for the 5.1V output terminal; and $I_{12.1\ VDC}$ is the average output current for the 12.1V output terminal.

In this manner, the maximum current allowed on each voltage line as well as the total current provided by the power supply 12 can be regulated. In one example, according to formulae (1)-(3) above, if the current drawn on the 5.1 VDC line is 30 amps and the current drawn on the 12.1 VDC line is 20 amps, the maximum current allowed to be drawn on the 3.3 VDC line is 24.6 amps. In addition, the total maximum current and/or total maximum power drawn on the power supply 12 can be regulated via the ALS component 14 utilizing the same or additional algorithms. It is to be appreciated that substantially any formulae can be employed by the ALS component 14 to accommodate any number of configurations and/or limitations of the power supply 12.

On the basis of the load (e.g., external components, etc.) being sensed, the maximum allowed current can be adjusted such that the overall power demand on the power supply 12 does not exceed a specified level (e.g., the power rating for the device, etc.). This allows for real time allocation of the power between the channels and extends the devices capability and/or applicability to a wider range of loads. In this manner, savings can be obtained by designing the power supply 12 to a lower maximum power capacity. Such savings can be partially offset by the need for load sensing and/or hardware to adjust the maximum allowable current.

Figure 4:
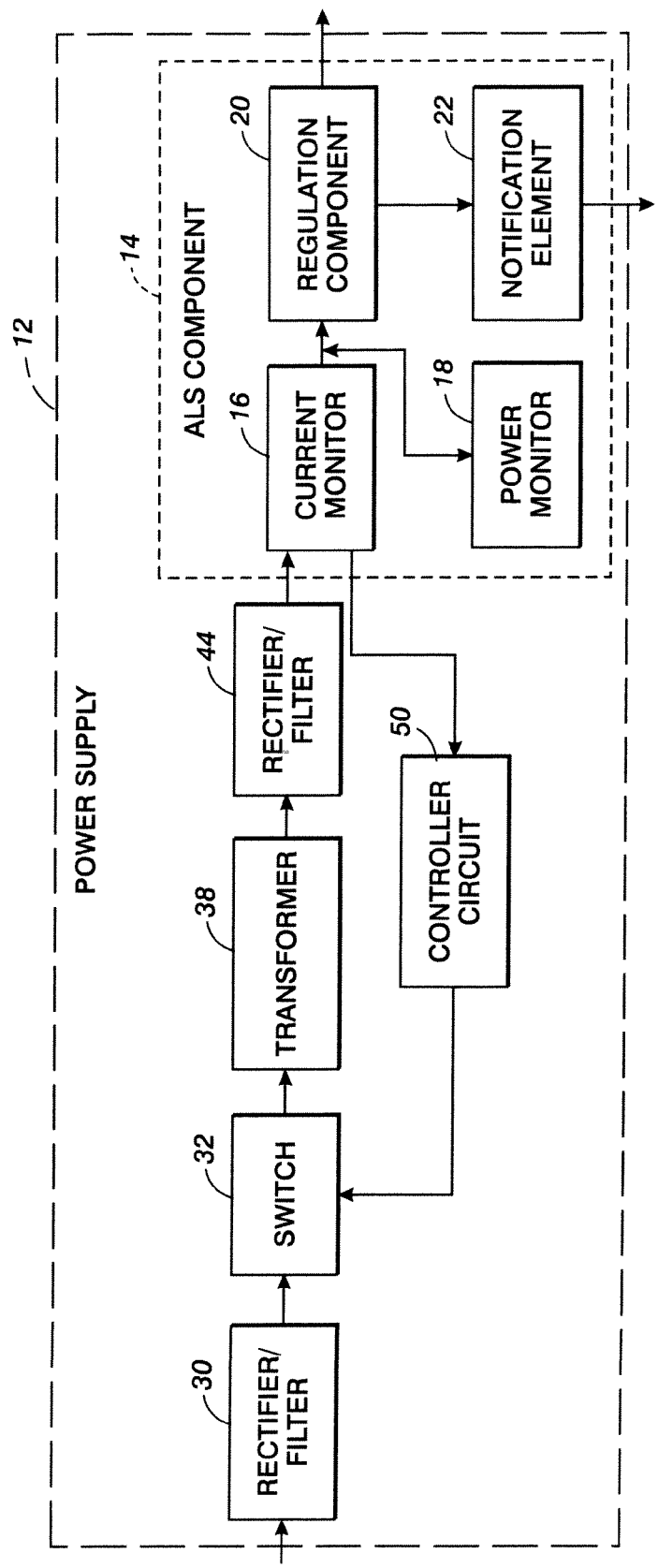
FIG. 4 illustrates the subcomponents of a power supply and the automatic load sensing component subcomponents.

FIG. 4 illustrates the power supply 12 which includes the rectifier/filter 30, the transformer 38, the rectifier/filter 44, the ALS component 14 and the controller circuit 50. The ALS component 14 includes the current monitor 16, the power monitor 18, the regulation component 20 and the notification element 22. In this embodiment, the current monitor 16 is placed in series with the output of the power supply 12. The current monitor allows power to pass through to the controller circuit 50, the regulation component 20 and the power monitor 18. The power monitor 18 can receive a current value from the current monitor 16 and calculate the power output from the power supply 12. Such calculation can be made based at least in part upon the current and voltage from the output line. The voltage of the output can be calculated utilizing one or more known measurement circuits and/or via a look up table that contains voltage values associated with one or more output lines.

The regulation component determines the amount of power allowed to be output from the power supply 12. In one approach, the regulation component 20 monitors the power and/or current and compares such values to one or more reference values. If the power and/or current exceeds these reference values, the regulation component 20 can power down the output, limit the current drawn from the output and/or provide a signal to the notification element 22. The notification element 22 can respond to such received signal by propagating a notice to a user via one or more media, such as an auditory and/or visual alarm, propagation of a control signal to one or more external control components, etc.

Figure 5:
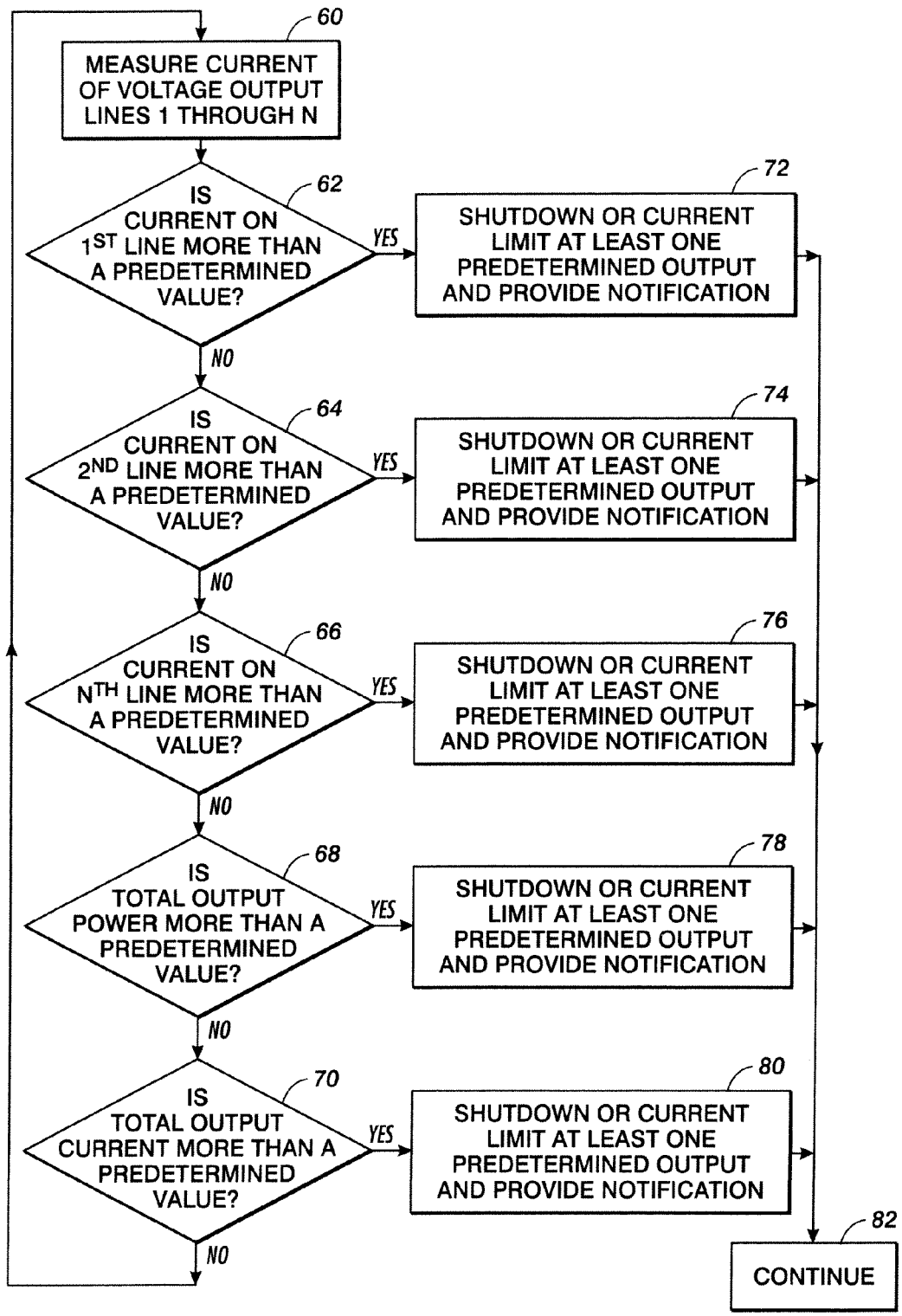
FIG. 5 illustrates a method of monitoring and responding to an over current and/or over power condition.

While, for purposes of simplicity of explanation, the methodology of FIG. 5 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

At reference numeral 60, the current level is measured on each of the output lines of a power supply. Such current level can be measured utilizing an ammeter, measurement circuit, etc. At 62, a determination is made as to whether current on a first voltage output exceeds a predetermined value. If the current level is below the predetermined value on the first voltage line, at 64, a determination is made to determine if the current is above a predetermined level on a second voltage output. If the current level is below the predetermined value on the second voltage line, at 66, a determination is made to determine if the current is above a predetermined level on an nth voltage output.

At 68, the total output power is calculated and compared to a predetermined threshold. Such predetermined threshold can be based at least in part upon the capabilities of the device being monitored in order to prevent deleterious effects associated therewith such as overloading, etc. At 70, the total output current is calculated and compared to a predetermined threshold. If the current level is below such predetermined threshold measurement begins again at reference numeral 60.

If the current level exceeds a predetermined threshold at 62, one or more outputs are shut down at 72 and a notification is provided to a user. If the current level exceeds a predetermined threshold at 64, one or more outputs are shut down at 74 and a notification is provided to a user. In one example, notification can include a particular error code to alert the user of a specific error condition. If the current level exceeds a predetermined threshold at 66, one or more outputs are shut down at 76 and a notification is provided to a user.

If the total output power exceeds a predetermined threshold at 68, one or more predetermined voltage outputs can be shut down and a notification is provided to a user at 78. In one approach, the highest voltage output is shut down first, followed by the second highest and so on until the output power is below the predetermined threshold. If the total output current exceeds a predetermined threshold at 70, one or more predetermined voltage outputs can be shut down and a notification is provided to a user at 80. The operation will continue at 82 after the at least one predetermined output is shut down or current limited and a notification is provide at 72, 74, 76, 78 or 80. The output monitoring algorithm is a constant activity as long as the power supply is powered by the input source.

It will be appreciated that variations of the above-disclosed and other features and functions, or alternatives thereof, may be desirably combined into many other different systems or applications. Various and variant embodiments presently unforeseen or unanticipated alternatives, modifications, variations or improvements therein may be subsequently made by those skilled in the art which are also intended to be encompassed by the following claims. In addition, the claims can encompass embodiments in hardware, software, firmware, or a combination thereof.

The invention claimed is:

1. A power supply, comprising:
   an input component that receives power from a source;
   an automatic load sense (ALS) component associated with the power supply that monitors and regulates at least two or more of current and power output from the power supply and further includes a current monitor that determines the amount of current provided by at least one of an output line and total current output by the power supply;
   a first rectifier/filter that converts and filters the received AC power into a DC signal;
   a switch that receives the DC signal from the first rectifier/filter and converts it to an AC signal by switching the signal on and off at a predetermined frequency;
   a transformer that receives the AC signal from the switch and converts the voltage level of the AC signal to a predetermined output level;
   a second rectifier/filter that converts and filters the AC signal received from the transformer to a DC signal and outputs this signal to the ALS component; and
   an output component that provides power from the ALS component to one or more variable load components.

2. The system according to claim 1, the automatic load sense component further including:
   a power monitor that determines the amount of power provided by at least one of an output line and total power output by the power supply.

3. The system according to claim 1, the automatic load sense component further including:
   a regulation component that controls the amount of current and/or power output by the power supply to stay below one or more predetermined thresholds based at least in part upon information from at least one of the current monitor and the power monitor.

4. The system according to claim 3, wherein the regulation can power down at least one output line, and/or power down the entire power supply, and output a signal to the notification component.

5. The system according to claim 1, the automatic load sense component further including:
   a notification element that provides a message based at least in part upon information received from at least one of the current monitor, the power monitor and the regulation component.

6. The system according to claim 1, further including:
   a controller circuit that monitors the voltage level of the DC signal sent to the ALS component and determines the frequency of the switch based at least in part upon this voltage level.

7. The system according to claim 1, wherein at least one of the current and the power level of each of the at least two signals is summed via the ALS component and compared to a predetermined value.

8. The system according to claim 1, wherein the ALS component employs at least one formula to determine the maximum allowable current output from the power supply.

9. The system according to claim 1, wherein the ALS component employs at least one formula to determine the maximum allowable power output from the power supply.

10. The system according to claim 1, further including:
    at least one variable load component that utilizes power from the power supply.

11. A method for regulating the output of a power supply, comprising:
    measuring the current on at least one voltage line output from the power supply;
    comparing the current measured from each voltage line to a predetermined reference value, where the predetermined reference value is based at least in part on the capabilities of the power supply; and
    shutting down at least one of the highest voltage line until the current is below a predetermined threshold.

12. The method according to claim 11, further comprising:
    summing the current of each of the at least one voltage line;
    comparing the summed current to a predetermined threshold; and
    shutting down at least one predetermined output if the summed current exceeds the predetermined threshold.

13. The method according to claim 11, further comprising:
    notifying a user that the summed current exceeds the predetermined threshold.

14. A system incorporating a housing, comprising:
    an electronic load that controls at least one variable load component associated with the system;
    a power supply operatively coupled to the electronic load that provides power to at least one variable component, where the power supply is at least one of an ATX/NLX, SFX, WTX, or other form factor designed to reside within the housing;
    an automatic load sense (ALS) component that monitors at least one of the current and the power provided on at least one voltage line by the power supply and monitors at least one of the total current and the total power output by the power supply;

a regulation component that compares at least one of power and current to a predetermined threshold and powers down at least one voltage line if at least one of the at least one of power and current exceed a predetermined threshold.

15. The system according to claim 14, wherein the ALS component shuts off power to at least one voltage output line of the power supply, and/or shuts off power to the entire power supply and provides a notification to a recipient if at least one of the total current and the total power exceeds a predetermined threshold.

16. The system according to claim 14, further including:
a controller circuit that monitors the voltage level of the DC signal sent to the ALS component and determines the frequency of the switch based at least in part upon this voltage level.

17. The system according to claim 14, wherein at least one of the current and the power level of each of the at least two signals is summed via the ALS component and compared to a predetermined value.

* * * * *